United States Patent [19]
Aschner et al.

[11] Patent Number: 6,161,383
[45] Date of Patent: Dec. 19, 2000

[54] CONTROL SYSTEM FOR THE SUPERCHARGING PRESSURE OF A SUPERCHARGING INTERNAL COMBUSTION ENGINE

[75] Inventors: Werner Aschner, Ulm; Philipp Bukovsek, Stuttgart, both of Germany

[73] Assignee: DaimlerChrysler AG, Stuttgart, Germany

[21] Appl. No.: 09/199,579

[22] Filed: Nov. 25, 1998

[30] Foreign Application Priority Data

Nov. 25, 1997 [DE] Germany .................. 197 51 977

[51] Int. Cl.[7] ........................................ F02D 23/00
[52] U.S. Cl. .................................................... 60/602
[58] Field of Search ....................................... 60/602

[56] References Cited

U.S. PATENT DOCUMENTS

| | | | |
|---|---|---|---|
| 5,228,292 | 7/1993 | Hanauer et al. | 60/602 |
| 5,782,092 | 7/1998 | Schultalbers et al. | 60/602 |
| 6,026,790 | 2/2000 | Itoyama | 123/568.16 |

FOREIGN PATENT DOCUMENTS

| | | |
|---|---|---|
| 0 323 256 | 7/1989 | European Pat. Off. . |
| 0 599 321 | 6/1994 | European Pat. Off. . |
| 0 747 585 | 12/1996 | European Pat. Off. . |
| 196 15 545 | 6/1997 | Germany . |

*Primary Examiner*—Noah P. Kamen
*Attorney, Agent, or Firm*—Evenson, McKeown, Edwards, Lenahan, P.L.L.C.

[57] ABSTRACT

A control system for the supercharging pressure of a supercharged internal combustion engine includes, for the purpose of using the dynamic properties of the turbocharger with adjustable turbine geometry of the internal combustion engine with respect to the supercharging pressure buildup, an open-loop control device in the operating path to the actuator; a turnoff regulating device for determining a regulation pulse duty factor which can be fed additively to the operating path; a changeover device arranged between the regulating device and the operating path; and a precontrol device for calculating a graduated precontrol pulse duty factor which can be fed to the operating path via an adder.

33 Claims, 6 Drawing Sheets

CONTROL SYSTEM FOR THE SUPERCHARGING PRESSURE OF A SUPERCHARGING INTERNAL COMBUSTION ENGINE

BACKGROUND AND SUMMARY OF THE INVENTION

This application claims the priority of Germany Application No. 197 51 977.6, filed Nov. 25, 1997, the disclosure of which is (are) expressly incorporated by reference herein.

The invention relates to a control system for the supercharging pressure of a supercharged internal combustion engine whose exhaust gas turbocharger has an actuator for the supercharging pressure, and has, in particular an adjustable turbine geometry.

It is already known from European Patent document EP 0 747 585 A2 to fit the control system with an open-loop control device as well as, in addition, a regulating device. The supercharging pressure is subjected to open-loop control in the lower load range of the internal combustion engine. The loop controller is only cut-in beginning in the upper load range. The supercharging pressure is then subjected to closed-loop control. The open-loop control device remains active in this case even in the load range subjected to closed-loop control, in order to ensure stable operation of the turbo charger.

For the purpose of setting the supercharging pressure, the open-loop control device reads out from characteristic diagrams desired values which are stored electronically as a function of the motor speed and the fuel injection quantity. The desired values are converted into a specific pulse duty factor with which the actuator is driven. For the purpose of subjecting the supercharging pressure to closed-loop control, the regulating device determines desired values, prescribed by a desired value/actual value comparison and determined actual values of the supercharging pressure, to determine a regulation pulse duty factor which is fed to the operating path to the actuator. The regulation pulse duty factor is added to the control pulse duty factor.

A switch is provided for the purpose of cutting in the closed-loop control during the transition from the lower to the upper load range. The switch is fed a fuel injection quantity signal and a speed signal on the input side. Cutting in is not performed until the fuel injection quantity signal overshoots a speed-dependent threshold which is read out from a characteristic curve. The regulation is cut out (discontinued) if, upon falling, the fuel quantity signal undershoots the speed-dependent threshold which, for the purpose of achieving a hysteresis effect, is read out form a lower characteristic curve running at a distance from and approximately parallel to the upper characteristic curve. A precontrol effect is provided in closed-loop control by: (1) the open-loop control device, likewise cut in, and (2) the looping through, associated therewith, of the control desired value of the supercharging pressure.

Exhaust gas turbochargers with adjustable turbine geometry have a high dynamic response in the supercharging pressure buildup. In the case of operating the variable turbine geometry (VTG) turbocharger with the known supercharging pressure control system, the supercharging pressure repeatedly overshoots the desired value when there is a rapid supercharging pressure build up. This leads directly to instances of detrimental overshooting of the exhaust gas counterpressure in the exhaust section of the internal combustion engine. A high exhaust gas counterpressure in consequence of the stagnation effect of the supercharger turbine acts on the drive pistons of the internal combustion engine and demands a higher level of work from the pistons to eject the exhaust gases. Since the overshooting of the exhaust gas counterpressure must be avoided at all costs, the known supercharging pressure control system cannot be used to achieve a build up of supercharging pressure which is optimum in terms of torque, particularly in non-stationary operating states of the supercharged internal combustion engine.

It is the object of the invention to develop the control system for the supercharging pressure such that the dynamic properties of the exhaust gas turbocharger with adjustable turbine geometry with respect to the build up of supercharging pressure are used in all operating states of the internal combustion engine, and that it is possible to build up the supercharging pressure in a way which is optimum in terms of torque.

This object is achieved according to the invention by a control system which permits both open-loop control of the supercharging pressure with desired values which are prescribed for the open-loop control device in the operating path to the actuator as a function of the engine speed and of the current fuel injection quantity, and closed-loop control of the supercharging pressure which always ensures a supercharging pressure which is optimum in terms of operating point and a build up of supercharging pressure which is optimum in terms of torque. The supercharging pressure is advantageously subjected to closed-loop control in further operating ranges of the internal combustion engine, in particular in the case of an increasingly higher partial load and in full load operation. In the case of a low partial load, the regulating device is switched off and the supercharging pressure is subjected to open-loop control. This is regarded as advantageous because of the fact that the characteristic curve of the exhaust gas turbocharger is flat in this load range. The changeover state is prescribed for the changeover device arranged between the regulating device and the operating path to the actuator. The changeover device uses a fuel injection parameter which is a function at least of speed, in order to indicate the changeover state between closed-loop operation and open-loop operation.

The control pulse duty factor as the current output signal of the open-loop control device, and the regulation pulse duty factor, additively fed in the closed-loop operation, of the regulating device proportionately form a pulse duty factor of the control system for influencing the actuator. A precontrol pulse duty factor is added before the actuator is reached. The precontrol pulse duty factor is calculated by a separate precontrol device from a required change in the desired value of an operating parameter of the internal combustion engine, and is not fed to the operating path to the actuator until downstream of the adder for the regulation pulse duty factor. The system deviation of the supercharging pressure as a result of the desired value/actual value comparison is preferably fed to the precontrol device as an input signal for determining the precontrol pulse duty factor. The proportion of the graduated precontrol pulse duty factor in the actuation pulse duty factor finally arriving at the actuator rises with the gradient of the required change in the desired value, as a result of which a dynamic build up of supercharging pressure is achieved, in particular in non-stationary operating states with the strengthened influence of the precontrol device on the adjustable turbine geometry.

Other objects, advantages and novel features of the present invention will become apparent from the following detailed description of the invention when considered in conjunction with the accompanying drawings.

DETAILED DESCRIPTION OF THE DRAWINGS

Figure 1:
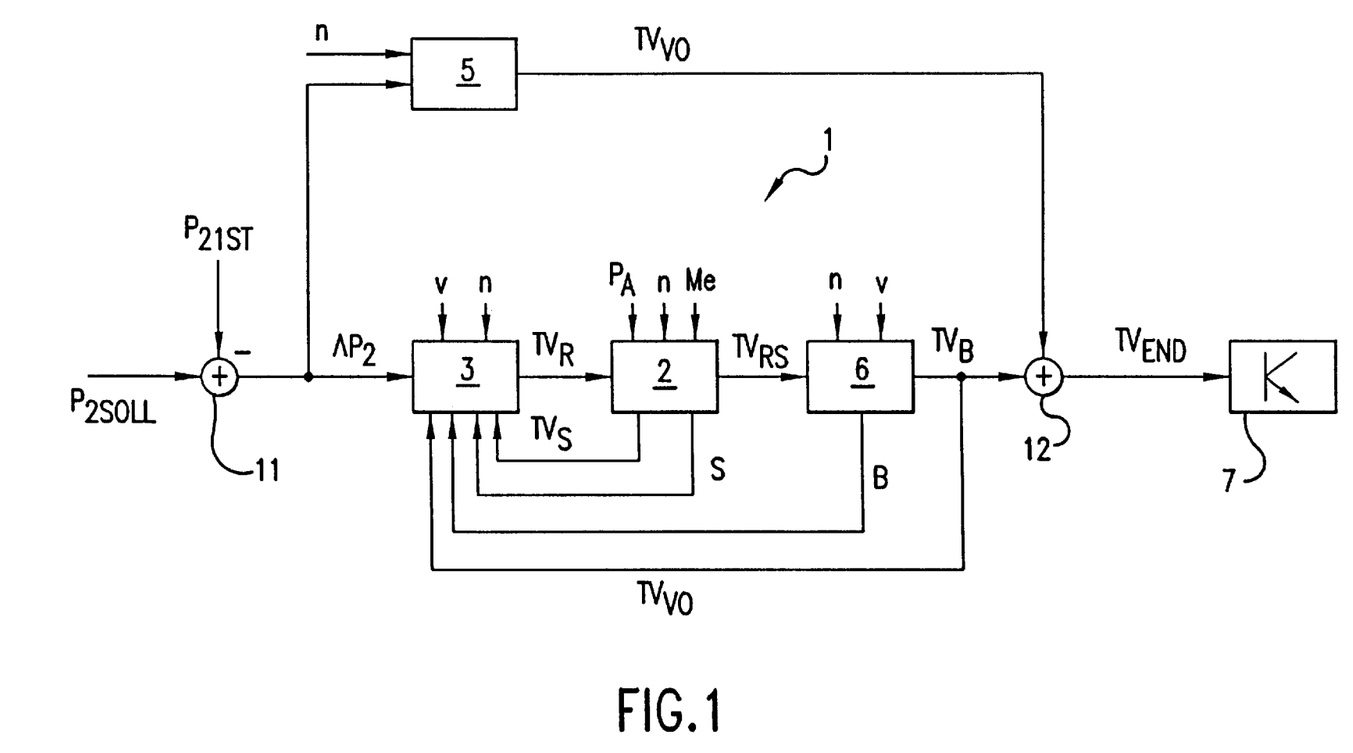
FIG. 1 is a block diagram of the devices of the control system according to the invention.

The block diagram of FIG. 1 shows the principle of the cooperation of the devices and components in the actuator operating path in the case of a control system for the supercharging pressure of a supercharged internal combustion engine. The actuator for the supercharging pressure forms a variably adjustable turbine geometry of the exhaust gas turbocharger of the internal combustion engine. The control system described below for the supercharging pressure via the setting of the adjustable turbine geometry is suitable, in particular, for use with supercharged internal combustion engines which can operate with direct fuel injection and can be fitted with common-rail injection systems. The dynamic properties of the VTG supercharger with respect to the build-up of supercharging pressure can be used with the control system according to the invention in all operating conditions, and a build-up of supercharging pressure which is optimum in terms of torque can be rendered possible. As a result, advantages can be achieved, in particular in operating such supercharged internal combustion engines which operate with an air excess, such as diesel internal combustion engines. The VTG supercharger and also the internal combustion engine are known per se and will therefore not be described in detail here.

The supercharging pressure control system represented in FIG. 1 generates an actuation pulse duty factor $TV_{END}$ for influencing the supercharging pressure, which duty factor is input into a supercharger output stage 7 of the exhaust gas turbocharger, and is appropriately converted for the purpose of setting the adjustable turbine geometry. The control system comprises an open-loop control device 2 and a turn-off regulating device 3. In the lower partial load range of the internal combustion engine, in which the characteristic curve of the exhaust gas turbocharger is flat, the regulating device 3 is advantageously turned off, the supercharging pressure being controlled thereby. A changeover is made to closed-loop operation in the case of a higher operating load. In order to determine a control pulse duty factor $TV_S$, the open-loop control device 2 is prescribed desired values as a function of the engine speed n and of the current fuel injection quantity Me. The open-loop control device 2 is described in more detail further below in relation to FIG. 2. A system deviation $\Delta P_2$ of the supercharging pressure is input into the regulating device 3 in order to determine a regulation pulse duty factor $TV_R$ which can be fed additively to the operating path 1. The system deviation $\Delta P_2$ is determined from a desired value/actual value comparison of the supercharging pressure, the determined actual value $P_{2act}$ of the supercharging pressure being fed back at a comparing element 11 to the desired value $P_{2neg}$ which is prescribed as a function of load, for example. The regulating device 3, which loops through further input variables for the purpose of determining the regulation pulse duty factor $TV_R$, is described in more detail further below with the aid of FIG. 3.

A changeover device is arranged between the regulating device 3 and the operating path 1 for the purpose of changing over between closed-loop control and open-loop control. The changeover device, which will be explained further later with the aid of FIG. 2, uses a fuel injection parameter formed from the input variables of the changeover device. This parameter is at least a function of rotational speed, in order to indicate a prescribed change of state between closed-loop control and open-loop control.

The control pulse duty factor $TV_S$ or, in the case of regulation of the discharging pressure, the raw pulse duty factor $TV_{RS}$ formed additively from the regulation pulse duty factor $TV_R$ and the control pulse duty factor $TV_S$ is fed to a limiting device 6 in the operating path to the actuator. The limiting device 6 is prescribed an upper bound and a lower bound as a function of an engine parameter for the purpose of defining a permissible pulse duty factor in which the incoming raw pulse duty factor $TV_{RS}$ is limited. The limiting device 6 optionally uses the input signal of the engine speed n or of the fuel consumption V of the internal combustion engine as engine parameters for the purpose of determining the limiting values of the pulse duty factor in a fashion specific to the operating point. The arrangement of the equipment as well as the function of the limiting device 6 will be described later with the aid of FIG. 4.

According to the invention, the control system has a precontrol device 5 which generates a graduated precontrol pulse duty factor $TV_{VO}$ independently of the open-loop control device 2 and the regulating device 3 in the operating path 1. The output side of the precontrol device 5 is connected to the operating path 1 via an adder 12 which is situated directly upstream of the control section in the operating direction. The pulse duty factor $TV_{END}$ finally fed to the control section, i.e., the supercharger output stage 7, is thus formed additively from the precontrol pulse duty factor $TV_{VON}$ and the output pulse duty factor $TV_B$ of the limiting device 6.

The precontrol pulse duty factor $TV_{VO}$ is graduated as a function of the required change in desired value of the supercharging pressure. However, it would also be possible to determine the change in the desired value of another operating parameter of the internal combustion engine such as, for example, the desired quantity of fuel to be injected. The proportion of the precontrol pulse duty factor $TV_{VO}$ at the pulse duty factor $TV_{END}$ finally passing to the supercharger output stage 7 rises with the gradient of the change in the desired value. The precontrol device 5, which is separated from the operating path 1 thus generates a weak precontrol pulse duty factor $TV_{VO}$ in stationary operating states of the internal combustion engine. This has the result that the precontrol effect on the supercharging pressure is slight, and the advantages of regulation come to bear fully. In non-stationary operating states, for example in the case of a high acceleration requirement or in braking operation of the internal combustion engine, the buildup of supercharging pressure is substantially influenced by a graduated precontrol pulse duty factor $TV_{VO}$. By contrast with closed-loop control or open-loop control of the supercharging pressure with subordinate closed-loop control, as provided by the arrangement of the open-loop control device 2 and the regulating device 3 with their proportionately generated pulse duty factor $TV_{RS}$, the build up of supercharging pressure in non-stationary operating states of the internal combustion engine can be rendered dynamic. Moreover, a further engine parameter, preferably the engine speed n as in the exemplary embodiment, is fed to the precontrol device 5 and used to classify the gradient determined. This is explained in more detail in the following description.

Figure 5:
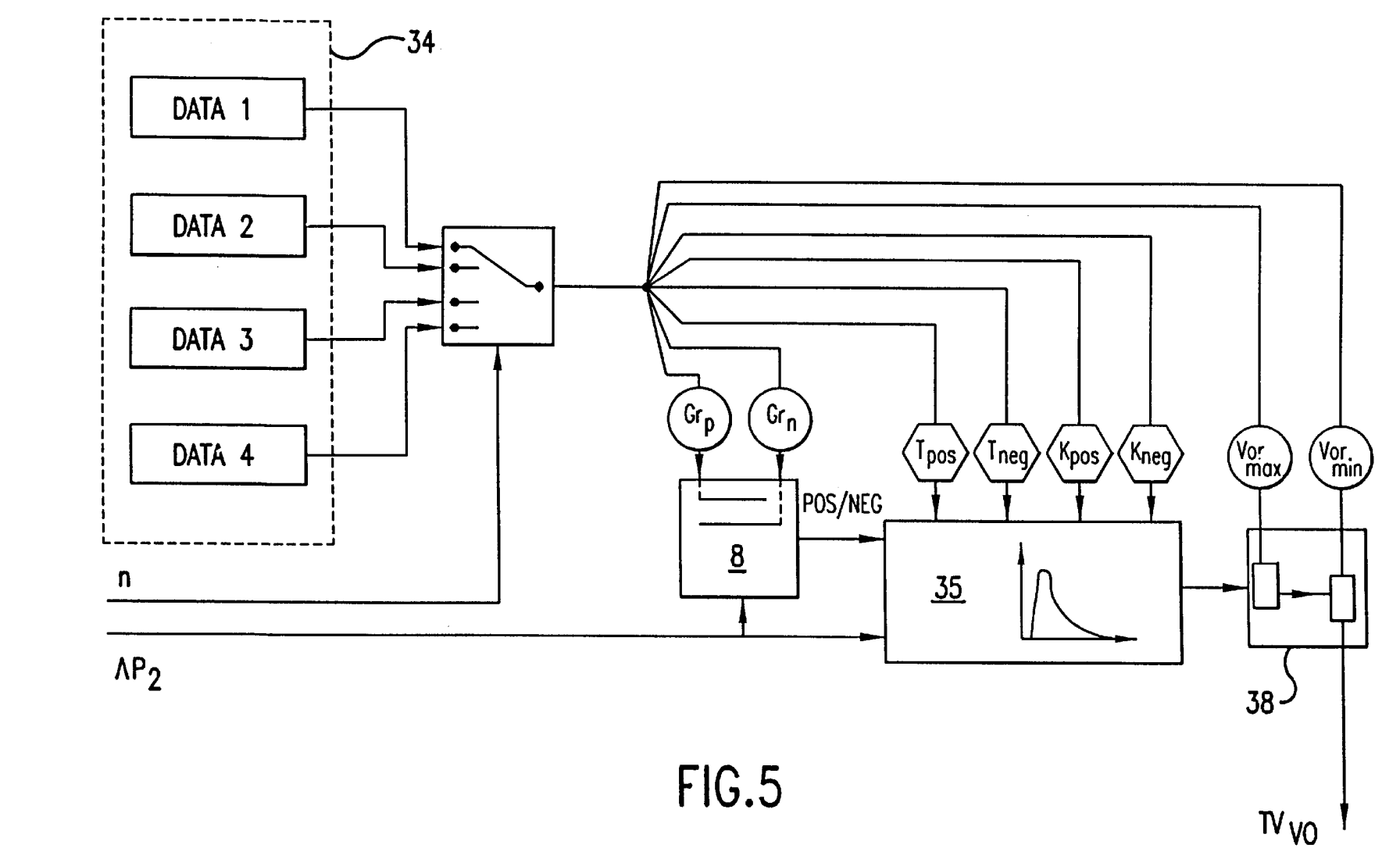
FIG. 5 is a block diagram of the components and transmission elements of the precontrol device according to the invention.

FIG. 5 shows a diagrammatic representation of the circuit of the precontrol device. The precontrol device is fed as an input signal the system deviation of the supercharging pressure $\Delta P_2$. The precontrol device comprises a control unit for generating the outgoing precontrol pulse duty factor $TV_{VO}$, which has a DT1 response characteristic. Dynamic precontrol is achieved by virtue of the fact that the response characteristic of the control unit 35 can be set by influencing the DT1 function. In this case, a gain K and the time constant T of the DT1 function are prescribed for the control unit 35 as transmission parameters. The suitable transmission parameters of the DT1 function of the control unit 35 are prescribed as a function of the slope of the gradient of the system deviation $\Delta P_2$. The precontrol device comprises a gradient detection device 8, in which a gradient control value is calculated by differentiation, from the input signal of the system deviation $\Delta P_2$. To classify the determined slope of the gradient, the gradient detection device 8 is prescribed two limit gradients $Gr_p$, $Gr_n$. These limit gradients delimit a gradient window free from precontrol in which no precontrol pulse duty factor is to be generated. If the determined supercharging pressure gradient is situated within the defined gradient window, the DT1 function of the control unit 35 is not parameterized, and the current output signal of the precontrol device, specifically the precontrol pulse duty factor $TV_{VO}$, decays with the e function typical of the DT1 response characteristic.

Individual transmission parameters for setting the DT1 response characteristic of the control unit 35 are provided for the two regions which have steep gradients and are situated outside the gradient window. If the determined slope of the gradient is above the upper limit gradient $Gr_p$ or below the lower limit gradient $Gr_n$, the gradient detection device transmits the information on the need to generate the precontrol pulse duty factor $TV_{VO}$ to the control unit 35. The control unit 35 has access to various transmission parameters for both regions situated outside the gradient window. Overshooting of the upper limiting value $Gr_p$ is indicated to the control unit 35 by a positive pulse POS, and the DT1 transmission function is set with the transmission parameters $T_{pos}$ and $K_{pos}$ provided for the positive pulse POS. Upon undershooting of the lower limit gradient $Gr_n$, the negative pulse NEG causes the parameterization of the DT1 function with the time constant $T_{neg}$ and the gain $K_{neg}$. A pair of constants of a prescribed gain $K_{pos}/K_{neg}$ and time constants $T_{pos}/T_{neg}$ are available to the DT1 element both for positive gradients POS and for negative gradients NEG of the gradient detection device 8. The output value of the DT1 element is initialized upon overshooting of one of the limit gradients $Gr_p$, $Gr_n$. An optimum build up of supercharging pressure can be achieved even given the occurrence of non-stationary operating states of the internal combustion engine with multiple successive positive and negative load changes, since with each load change regeneration of the output pulse duty factor starts with a value of zero, and amplification values which may not yet have decayed are erased.

The precontrol device 5 further comprises a limiting unit 38 downstream of the control unit 35. Constant limiting values, specifically an upper precontrol limiting value $Vor_{max}$ and a lower precontrol limiting value $Vor_{min}$, are prescribed for the limiting unit 38 in order to limit the outgoing precontrol pulse duty factor $TV_{VO}$. The limiting device 38 ensures that the precontrol pulse duty factor $TV_{VO}$ generated by the precontrol device is inside the window defined by these limiting values, and precludes undesired peaks in the pulse duty factor.

The constants, specifically the limit gradients $Gr_p$, $Gr_n$, the threshold values $Vor_{max}$, $Vor_{min}$ of the precontrol pulse duty factor, and the gains and the time constants of the DT1 function, required for generating the graduated precontrol pulse duty factor $TV_{VO}$ are stored in a parameter memory 34 such that they can be retrieved together as a combined parameter set.

A plurality of parameter sets DATA1 to DATA4 for different operating states of the internal combustion engine are stored in the parameter memory 34 of the precontrol device. The parameter sets DATA1 to DATA4 are assigned in each case to specific speed ranges of the internal combustion engine. Four different parameter sets DATA1 to DATA4 with setting parameters which are determined in advance and matched to the respective operating state are separated by speed thresholds and cover the entire speed range of the internal combustion engine. The current speed n of the internal combustion engine is input into the precontrol device 5 for the purpose of determining the parameter set which is to be respectively read out and upon which the generation of the precontrol pulse duty factor is based.

Figure 2:
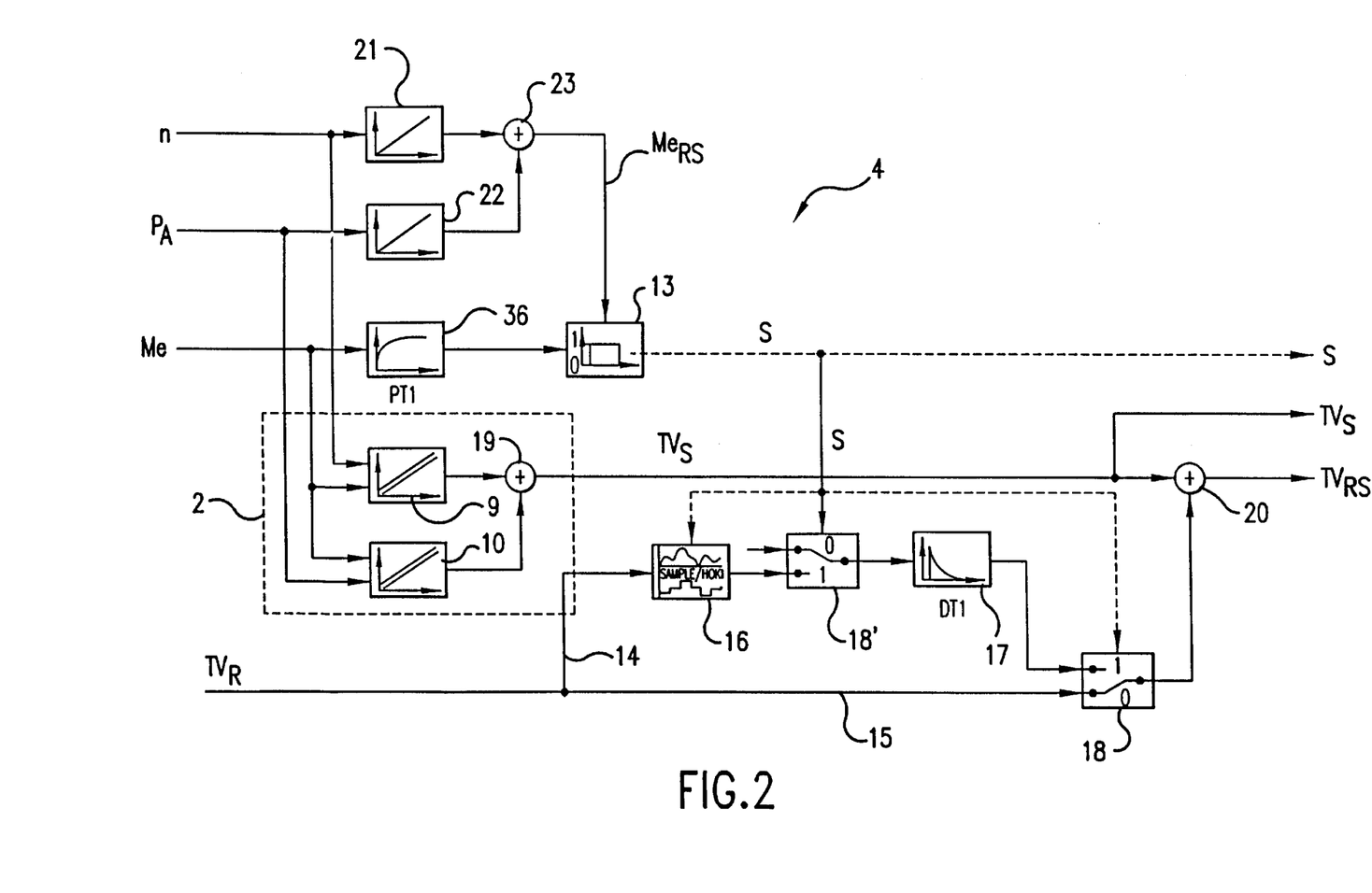
FIG. 2 is a block diagram of the components and transmission elements of the changeover device of the control system according to the invention.

The open-loop control device 2 and the changeover device 4 of the control system according to the invention are described below in more detail with the aid of FIG. 2. The open-loop control device 2 is assigned a basic characteristic curve diagram 9 in which desired values are electronically stored and can be read out for the purpose of determining the control pulse duty factor $TV_S$ as a function of the engine speed n and the current fuel injection quantity Me of the internal combustion engine. Also available for reading out to the open-loop control device 2, in addition to the basic characteristic curve diagram 9, is a correction characteristic diagram 10 in which correction values for the desired values of the basic characteristic curve diagram 9 are stored as a function of the ambient pressure and the fuel injection quantity. The desired values and correction values respectively read out from the characteristic diagrams are combined via an adder 19 to form the control pulse duty factor $TV_S$. The additive combination of the desired values and the correction values permits the supercharging pressure to be controlled in a way dependent on speed and load and likewise capable of level correction.

An adder 20 for combining the control pulse duty factor $TV_S$ and the regulation pulse duty factor $TV_R$ of the regulating device to form the common raw pulse duty factor $TV_{RS}$ is arranged in the operating path of the control system downstream of the open-loop control device 2. Arranged between the regulating device and the operating path is the changeover device 4 which uses switches 18, 18' to control the signal-transmitting connection between the regulating device and the operating path in order to changeover from closed-loop control to open-loop control of the control system.

In order to indicate a changeover state between closed-loop control and open-loop control, the changeover device 4 detects the current fuel injection quantity Me and compares the latter with a reference signal, formed as a function of operating point, of a fuel quantity threshold $Me_{RS}$. If the current fuel injection quantity is above the determined fuel quantity threshold $Me_{RS}$, a switch is made to closed-loop control. In order to determine the fuel quantity threshold $Me_{RS}$, a basic threshold value is read out from a basic characteristic curve 21 as a function of the speed n of the internal combustion engine and combined via an adder 23 with a level correction value which can be taken from a correction characteristic curve 22 as a function of the ambient pressure $P_A$. For the case in which the determined injection quantity Me is in the region of the fuel quantity threshold $Me_{RS}$, the circuit for classifying the injection quantity is provided, if appropriate, with a hysteresis element 13 in order to preclude continuous jumping between closed-loop control and open-loop control due to fluctuating values of the current input values. Depending on the decision of the changeover device as to whether the supercharging pressure is to be subjected to open-loop control or closed-loop control, a Boolean switching signal S is generated which has information on the circuit state of the changeover device 4. In order to preclude bouncing of the switching signal S, the current injection quantity Me is smoothed in a PT1 filter 36 before input into the hysteresis element 13.

The switching signal S determines the switch position of the switches 18, 18' of the changeover device 4, which control the passage of the closed-loop control pulse duty factor $TV_R$ to the adder 20 in the operating path to the actuator. The changeover device has a transition circuit which is connected, as an alternative, in parallel with the bypass branch 15 of the closed-loop control pulse duty factor $TV_R$. The transition circuit in the parallel branch 14 of the bypass branch 15 comprises a sample-and-hold element 16 and a downstream DT1 element 17 which, upon a changeover from closed-loop control to open-loop control, ensure that the closed-loop control pulse duty factor to be switched off decays exponentially to the value of zero. This provides continuous closed-loop control of the supercharging pressure during the changeover to open-loop control, and ensures that the raw pulse duty factor $TV_{RS}$, still comprising open-loop control components and closed-loop control components, is generated without jumps during the changeover. Depending on the switching signal S of the changeover device 4, a logic switch 18 at the node of the bypass branch 15 and of the parallel branch 14 for the transition circuit, and a second logic switch 18', which is arranged in the parallel branch 14, assume the position assigned to the respective operating state of the changeover device (open-loop control/closed-loop control).

Figure 3:
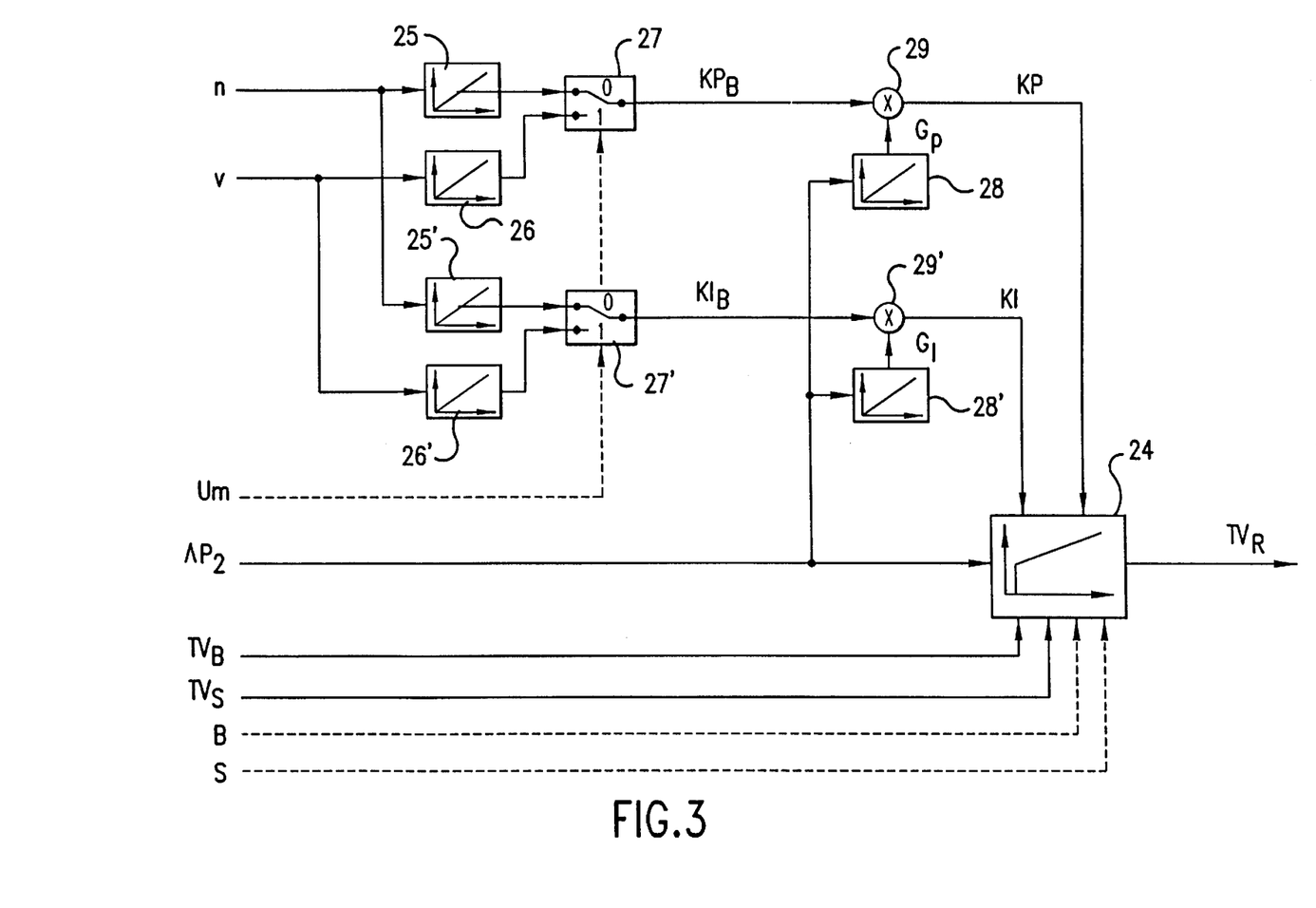
FIG. 3 is a block diagram of the components and transmission elements of the regulating device of the control system according to the invention.

The switching signal S and the open-loop control pulse duty factor $TV_S$ are input into the closed-loop control device, which will be explained in more detail below with the aid of FIG. 3.

The closed-loop control device comprises a loop controller 24 which is constructed as a PI controller into which there are input as input variables for the purpose of generating the closed-loop control pulse duty factor $TV_R$ the system deviation $\Delta P_2$ of the desired value/actual value comparison of the supercharging pressure (see FIG. 1), the open-loop control pulse duty factor $TV_S$ and gains, which can be prescribed as a function of the operating point, for the outgoing closed-loop control pulse duty factor $TV_R$. Furthermore, the PI controller 24 considers the switching signal S of the changeover device (FIG. 2) and a Boolean limiting signal B concerning the on state of the limiting device, which is downstream in the operating path, and loops through the output pulse duty factor $TV_B$ of the limiting device during generation of the closed-loop control pulse duty factor $TV_R$. For the purpose of forming a gain KP with a proportional action and a gain KI with an integrating action for the P components and I components, respectively, of the PI controller 24, the closed-loop control device comprises basic characteristic curves with basic gains $KP_B$, $KI_B$ stored as a function of operating point. The closed-loop control device further comprises weighting characteristic curves 28, 28' with weighting factors which can be derived as a function of the system deviation $\Delta P_{21}$ specifically $G_P$ for the P component and $G_I$ for the I component. Basic characteristic curve curves 25, 26 which can be read out optionally are provided for the purpose of determining the basic gains, this being done in each case as a function of the speed n or the fuel consumption V of the internal combustion engine.

The selection of the desired criterion for reading out the respective characteristic curve is performed by a switch 27 to which a changeover signal Um of a software switch is applied. The gain KP, KI of the P component and I component, respectively, is formed in each case from the product of the basic gain and the weighting factor, which are combined in a multiplier 29, 29'. In the case of large system deviations $\Delta P_2$, the weighting characteristic curve effects a large gain in the closed-loop control pulse duty factor $TV_R$ as a function of the system deviation, while the gain is reduced in an analogous fashion for small system deviations.

In open-loop control or in the case of active limitation of the pulse duty factor by the limiting device, the I component of the PI controller 24 continuously performs initialization in accordance with the following initialization rule:

$$I_O = TV_B - \Delta P_2 \cdot KP - TV_S$$

This initialization rule ensures that the pulse duty factor $TV_B$ experiences no jump at the output of the limiting device upon changeover to closed-loop control of the supercharging pressure. The cutting in of the closed-loop control pulse duty factor $TV_R$ relative to the open-loop control pulse duty factor is thus synchronized. During closed-loop control, and in the case of an unlimited pulse duty factor at the output of the limiting device, the I component of a PI controller 24 is calculated in accordance with the customary integration formula:

$$I_O = I_{-1} + \Delta P_2 \cdot KI \cdot \Delta t$$

Figure 4:
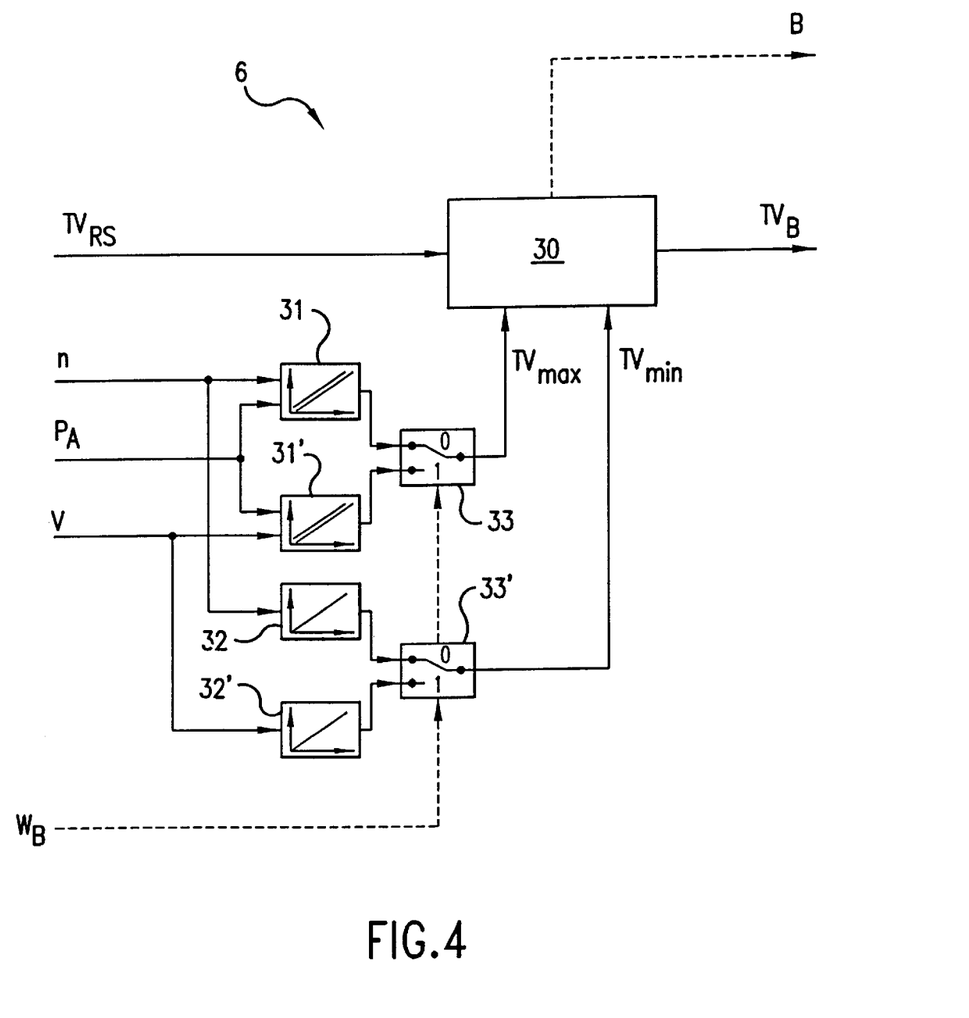
FIG. 4 is a block diagram of the components and transmission elements of a limiting device of the control system according to the invention.

FIG. 4 is used below to describe the limiting device which is arranged in the operating path to the actuator downstream of the adder of the closed-loop control device. The limiting device 6 comprises a logic module 30 for which there is prescribed as a function of operating point an upper limit $TV_{max}$ and a lower one $TV_{min}$ for limiting the incoming raw pulse duty factor $TV_{RS}$. If the incoming raw pulse duty factor $TV_{RS}$, is situated inside the permissible value window defined by the limiting values, the raw pulse duty factor is passed on without limitation. If the input value is situated outside the value window, a limitation is performed, and the outgoing pulse duty factor $TV_B$ is set to the limiting value respectively overshot. When limitation is cut in, a Boolean limiting signal B is generated and fed to the PI controller of the closed-loop control device for the purpose of selecting the suitable initialization rule of the I component. The upper limiting values $TV_{max}$ are stored electronically in a limiting characteristic diagram 31 as a function of an engine parameter and, in addition, as a function of the atmospheric pressure. These can be read out if required. In this case, taking the atmospheric pressure PA into consideration permits the optimum limiting window to be determined with a level correction. The lower limiting values $TV_{min}$ are read out from a limiting characteristic curve 32 as a function of the engine parameter.

The limiting device comprises two limiting characteristic diagrams 31, 31' for the upper limiting value $TV_{max}$ and two limiting characteristic curves 32, 32' for the lower limiting value $TV_{min}$, the information of which is stored in each case as a function of various engine parameters. In addition to a speed-dependent limiting characteristic diagram 31 and a speed-dependent limiting characteristic curve 32, there are set up in the exemplary embodiment a characteristic diagram 31' and a characteristic curve 32' of limiting values which are stored electronically, and which can be read out as an alternative and held ready as a function of the fuel consumption of the internal combustion engine. Thus, limiting values can be prescribed optionally as a function of the speed n or the fuel consumption V of the internal combustion engine. Access to the speed-dependent limiting characteristic diagram 31 with the corresponding limiting characteristic curve 32 for the lower limiting value, or the alternative putting in of the consumption-dependent limiting characteristic diagram 31' in conjunction with the corresponding limiting characteristic curve 32' is determined by the setting of selector switches 33, 33', to which a selection signal $W_B$ of a software switch is applied. One or the other of the settings can be advantageous, depending on the conditions under which the internal combustion engine is being operated in general.

The consumption signal V as a criterion which is a function of operating point and is used to read out the characteristic diagram 31' and the corresponding characteristic curve 32' is determined in a standardized fashion using the following calculating rule:

$$V \text{ [liter/min]} = n \text{ [1/min]} \cdot Me \text{ [mm}^3\text{/piston stroke]} \cdot (\text{number of cylinders}/2) \cdot 10^{-6}$$

Figure 6:
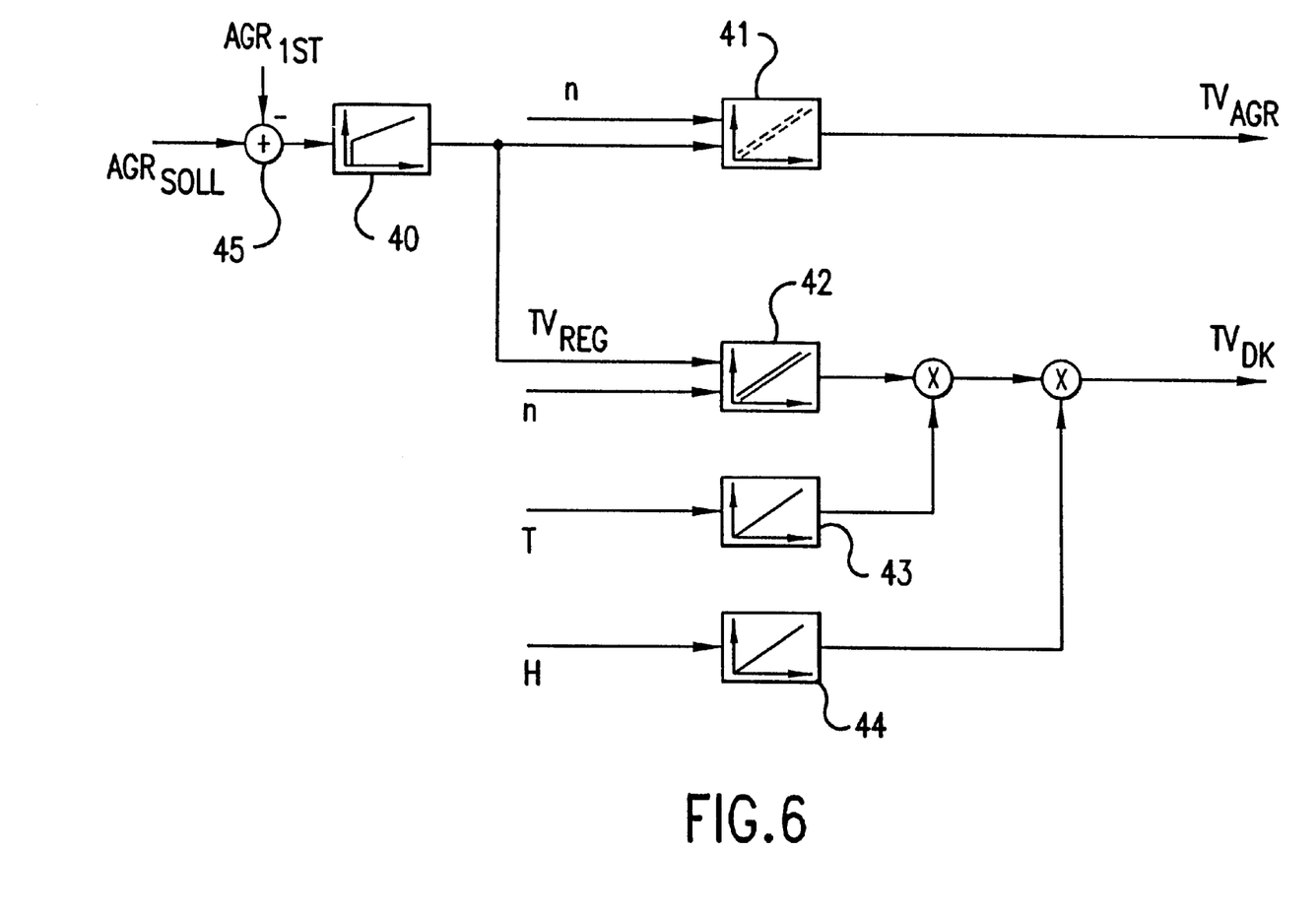
FIG. 6 is a block diagram of an exhaust gas recirculation regulating system advantageously used with the control system of the supercharging pressure.

The above-described supercharging pressure control system is advantageously used for those supercharged internal combustion engines which operate with exhaust gas recirculation. FIG. 6 shows a circuit diagram of a closed-loop control device for the exhaust gas recirculation rate which drives as actuators an exhaust gas recirculation valve usually arranged in an exhaust gas recirculation pipe, and moreover makes use of a throttle valve in the inlet region of the internal combustion engine in order to increase the exhaust gas recirculation rate. The device comprises a loop controller unit 40 into which the system deviation of the exhaust gas recirculation rate AGR is input. The system deviation is formed in this case by subtracting a measured actual value of the exhaust gas recirculation rate $AGR_{ist}$ from a required desired value $AGR_{soll}$ at a logic element 45. The output signal $TV_{REG}$ of the exhaust gas recirculation loop controller 40 is fed as a variable to a valve control characteristic diagram 41 from which an exhaust gas recirculation pulse duty factor $TV_{AGR}$ is derived for setting the exhaust gas recirculation valve. The valve control characteristic diagram 41 is read out as a function of the current speed n of the internal combustion engine in addition to the loop controller pulse duty factor $TV_{REG}$.

Provided for the purpose of forming a throttle valve pulse duty factor $TV_{DK}$ is a separate throttle valve characteristic diagram 42 which, in a fashion resembling the valve characteristic diagram 41, can be read out as a function of the loop controller pulse duty factor $TV_{REG}$ of the exhaust gas recirculation loop controller 40 and, in addition, as a function of the current speed n of the internal combustion engine. The value derived from the throttle valve characteristic diagram 42 is optimized by multiplicative combination with correction values before being input into an actuator of the throttle valve. Provided for this purpose is a correction characteristic curve 43, which can be read out as a function of the temperature T of the internal combustion engine, and, furthermore, a level correction characteristic curve 44 whose data can be derived as a function of atmospheric pressure H. The temperature characteristic curve 43 and the level characteristic curve 44 accordingly render it possible for the throttle effect of the throttle valve to be reduced as a function of cooling water and/or level, and permit the exhaust gas recirculation rate to be set optimally with respect to the operating point. The described throttle valve open-loop control for influencing the exhaust gas recirculation rate is suitable, in particular, for use in direct-injection internal combustion engines such as the internal combustion engine described in the exemplary embodiment and operating with common rail injection, in which machines the throttle valve can be used principally to increase the maximum exhaust gas recirculation rate.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for supercharging pressure of a supercharged internal combustion engine having an exhaust gas turbo charger with an actuator for modifying the supercharging pressure, the system comprising:

an open-loop control device in an operating path to the actuator, which open-loop control device is assigned at least one basic characteristic curve diagram in which desired values are electronically stored, at least as a function of engine speed (n) and current fuel injection quantity (Me), and are held ready for reading out in order to determine an open-loop control pulse duty factor ($TV_S$);

a closed-loop control device for determining a closed-loop control pulse duty factor ($TV_R$), which can be fed additively to the operating path, from a desired/actual value comparison of prescribable desired values ($P_{2des}$) and determined actual values ($P_{2act}$) of the supercharging pressure ($P_{2act}$);

a changeover device which is arranged between the closed-loop control device and the operating path and uses a fuel injection quantity parameter, which is at least a function of rotational speed, in order to indicate a prescribed change of state between closed-loop control and open-loop control; and a precontrol device for calculating a precontrol pulse duty factor ($TV_{VO}$) having a value which is a function of a required desired value of at least one operating parameter of the internal combustion engine and which is fed to the operating path via an adder.

2. The control system according to claim 1, further comprising a limiting device arranged in the operating path downstream of a second adder of the closed-loop control device, which limiting device can be prescribed an upper bound ($TV_{max}$) and a lower bound ($TV_{min}$) limiting value for limiting the incoming raw pulse duty factor ($TV_{RS}$) as a function of at least one engine parameter (n, V).

3. The control system according to claim 2, wherein the limiting values ($TV_{max}$, $TV_{min}$) are a function of one of the speed (n) and the fuel consumption (V).

4. The control system according to claim 3, wherein the upper limiting values ($TV_{max}$) are stored electronically with an additional dependence on atmospheric pressure ($P_A$) in a limiting characteristic diagram.

5. The control system according to claim 2, wherein the first adder for the precontrol pulse duty factor ($TV_{VO}$) is situated in the operating path downstream of the limiting device.

6. The control system according to claim 3, wherein the first adder for the precontrol pulse duty factor ($TV_{VO}$) is situated in the operating path downstream of the limiting device.

7. The control system according to claim 4, wherein the first adder for the precontrol pulse duty factor ($TV_{VO}$) is situated in the operating path downstream of the limiting device.

8. The control system according to claim 1, wherein the changeover device has a transition circuit which is connected as an alternative to passing the closed-loop control pulse duty factor ($TV_{VR}$) and which comprises a sample-and-hold element with a downstream DT1 element.

9. The control system according to claim 1, wherein the changeover device considers the atmospheric pressure ($P_A$) when determining the changeover state between open-loop control and closed-loop control.

10. The control system according to claim 1, wherein the closed loop-control device comprises a loop which is fed as input variables a system deviation ($\Delta P_2$) of the desired value/actual value comparison of the supercharging pressure ($P_2$), as well as at least the control pulse duty factor ($TV_S$), and which can be prescribed gains (KP, KI) for the outgoing regulation pulse duty factor ($TV_R$) as a function of the operating point.

11. The control system according to claim 10, wherein the loop controller is constructed as a PI controller and, for the purpose of forming a proportional gain (KP) as well as a gain (KI) with an integrating action, the closed loop control device includes stored values forming basic characteristic curves with basic gains ($KP_B$, $KI_B$), stored as a function of the operating point, and weighting characteristic curves (28, 28') with weighting factors ($G_P$, $G_I$) which can be derived as a function of the system deviation ($\Delta P_2$).

12. The control system according to claim 11, wherein provided are one of basic characteristic curves which can be read out as a function of the engine speed (n), and the basic characteristic curves which can be read out as a function of fuel consumption (V).

13. The control system according to claim 10, wherein a loop controller loops through the output pulse duty factor ($TV_B$) of the limiting device.

14. The control system according to claim 11, wherein a loop controller loops through the output pulse duty factor ($TV_B$) of the limiting device.

15. The control system according to claim 12, wherein a loop controller loops through the output pulse duty factor ($TV_B$) of the limiting device.

16. The control system according to claim 1, wherein a loop controller is connected in a signal-transmitting fashion both to the changeover device and to the limiting device and in each case receives a Boolean parameter (S, B) with information on a respective operating state, an associated initialization instruction for the I component being held ready in the loop for each combination of the Boolean parameters (S, B).

17. The control system according to claim 1, wherein as an input signal for determining the precontrol pulse duty factor ($TV_{VO}$), the precontrol device is fed the system deviation of the supercharging pressure ($\Delta P_2$).

18. The control system according to claim 1, wherein a control unit of the precontrol device has a DT1 response characteristic for the purpose of producing the outgoing precontrolled pulse duty factor ($TV_{VO}$).

19. The control system according to claim 18, wherein the response characteristic of the control unit can be set by prescribing at least one transmission parameter, preferably a gain ($K_{pos}$, $K_{neg}$) and a time constant ($T_{pos}$, $T_{neg}$) of the DT1 function.

20. The control system according to claim 19, wherein the precontrol device comprises a limiting unit which is downstream of the control unit and which is prescribed an upper precontrol limiting value ($Vor_{max}$) and a lower precontrol limiting value ($Vor_{min}$) for the purpose of limiting the outgoing precontrol pulse duty factor ($TV_{VO}$).

21. The control system according to claim 19, wherein the precontrol device comprises a gradient detection device of the required change in desired value from the input signal, the transmission parameters of the DT1 function of the control unit being prescribed as a function of the determined slope of the gradient.

22. The control system according to claim 21, wherein the precontrol device comprises a limiting unit which is downstream of the control unit and which is prescribed an upper precontrol limiting value ($Vor_{max}$) and a lower precontrol limiting value ($Vor_{min}$) for the purpose of limiting the outgoing precontrol pulse duty factor ($TV_{VO}$).

23. The control system according to claim 21, wherein the precontrol device is assigned a parameter memory from which it is possible to extract a parameter set (DATA1–DATA4) with the setting parameters ($Gr_p$, $Gr_n$, $T_{pos}$, $T_{neg}$, $K_{pos}$, $K_{neg}$, $Vor_{max}$, $Vor_{min}$) to be prescribed for the precontrol device when generating the precontrol pulse duty factor ($TV_{VO}$).

24. The control system according to claim 21, wherein for the purpose of classifying the determined slope of the gradient, the gradient detection device is prescribed two limit gradients ($Gr_p$, $Gr_n$) which delimit a gradient window free from precontrol, and individual transmission parameters for setting the DT1 response characteristic of the control unit are provided for the two regions situated outside the gradient window.

25. The control system according to claim 24, wherein the precontrol device comprises a limiting unit which is downstream of the control unit and which is prescribed an upper precontrol limiting value ($Vor_{max}$) and a lower precontrol limiting value ($Vor_{min}$) for the purpose of limiting the outgoing precontrol pulse duty factor ($TV_{VO}$).

26. The control system according to claim 24, wherein the precontrol device is assigned a parameter memory from which it is possible to extract a parameter set (DATA1–DATA4) with the setting parameters ($Gr_p$, $Gr_n$, $T_{pos}$, $T_{neg}$, $K_{pos}$, $K_{neg}$, $Vor_{max}$, $Vor_{min}$) to be prescribed for the precontrol device when generating the precontrol pulse duty factor ($TV_{VO}$).

27. The control system according to claim 18, wherein the precontrol device comprises a limiting unit which is downstream of the control unit and which is prescribed an upper precontrol limiting value ($Vor_{max}$) and a lower precontrol limiting value ($Vor_{min}$) for the purpose of limiting the outgoing precontrol pulse duty factor ($TV_{VO}$).

28. The control system according to claim 27, wherein the precontrol device is assigned a parameter memory from which it is possible to extract a parameter set (DATA1–DATA4) with the setting parameters ($Gr_p$, $Gr_n$, $T_{pos}$, $T_{neg}$, $K_{pos}$, $K_{neg}$, $Vor_{max}$, $Vor_{min}$) to be prescribed for the precontrol device when generating the precontrol pulse duty factor ($TV_{VO}$).

29. The control system according to claim 19, wherein the precontrol device is assigned a parameter memory from which it is possible to extract a parameter set (DATA1–DATA4) with the setting parameters ($Gr_p$, $Gr_n$, $T_{pos}$, $T_{neg}$, $K_{pos}$, $K_{neg}$, $Vor_{max}$, $Vor_{min}$) to be prescribed for the precontrol device when generating the precontrol pulse duty factor ($TV_{VO}$).

30. The control system according to claim 29, wherein a plurality of parameter sets (DATA1–DATA4) are stored in the parameter memory for different operating states of the internal combustion engine.

31. The control system according to claim 30, wherein the parameter sets (DATA1–DATA4) are respectively assigned to specific speed ranges of the internal combustion engine, and the current speed (n) of the internal combustion engine is input into the precontrol device for the purpose of determining the parameter set (DATA1–DATA4) to be read out and prescribed.

32. The control system according to claim 1, wherein the exhaust gas turbo charger has an adjustable turbine geometry.

33. The control system according to claim 1,
wherein said supercharged internal combustion engine operates with exhaust gas recirculation and direct injection;
wherein a rate of exhaust gas recirculation is subject to open-loop control by said open-loop control device or closed-loop control by said closed-loop control device, and wherein a changeover between said open-loop control and closed-loop control by said changeover functions through an exhaust gas recirculation valve and an exhaust gas recirculation line, and wherein the exhaust gas recirculation rate is increased by setting a throttle valve in an inlet region of the internal combustion engine with the throttle valve being coupled with the exhaust gas recirculation valve.

* * * * *